(12) United States Patent
Paxton

(10) Patent No.: US 11,065,756 B2
(45) Date of Patent: Jul. 20, 2021

(54) TOOL BAG CARRYING ASSEMBLY

(71) Applicant: Wilmot Paxton, Mims, FL (US)

(72) Inventor: Wilmot Paxton, Mims, FL (US)

( * ) Notice: Subject to any disclaimer, the term of this patent is extended or adjusted under 35 U.S.C. 154(b) by 0 days.

(21) Appl. No.: 16/294,176

(22) Filed: Mar. 6, 2019

(65) Prior Publication Data

US 2021/0170567 A1  Jun. 10, 2021

(51) Int. Cl.
| | |
|---|---|
| *B25H 3/00* | (2006.01) |
| *A45C 13/04* | (2006.01) |
| *A45F 5/10* | (2006.01) |
| *F16M 13/04* | (2006.01) |
| *A45C 13/02* | (2006.01) |

(52) U.S. Cl.
CPC ............... *B25H 3/00* (2013.01); *F16M 13/04* (2013.01); *A45C 13/02* (2013.01); *A45C 13/04* (2013.01); *A45F 5/102* (2013.01)

(58) Field of Classification Search
CPC .......... B25H 3/00; B25H 3/003; F16M 13/04; A45C 13/02; A45C 13/04; A45C 13/08; A45F 5/102
USPC ........ 206/349, 371; 24/3.1, 15, 3.2, 3.5, 3.7, 24/17 R
See application file for complete search history.

(56) References Cited

U.S. PATENT DOCUMENTS

| | | | | |
|---|---|---|---|---|
| 4,707,889 A | * | 11/1987 | Sato ....................... | A45C 13/04 150/105 |
| 4,824,156 A | * | 4/1989 | Greene .................... | A45F 5/10 294/137 |
| 5,341,975 A | | 8/1994 | Marinescu | |
| 6,536,590 B1 | * | 3/2003 | Godshaw ................. | B25H 3/00 206/373 |
| 6,986,538 B1 | * | 1/2006 | Ecker ....................... | B25H 3/00 206/349 |
| 7,314,153 B2 | | 1/2008 | Musarella et al. | |
| 8,006,353 B2 | * | 8/2011 | Reynolds .................. | A45F 5/02 24/3.13 |
| 9,079,063 B2 | | 7/2015 | Knight | |
| 9,232,850 B2 | * | 1/2016 | Moreau .................... | A45F 5/02 |
| 2002/0113107 A1 | | 8/2002 | Hartranft et al. | |
| 2002/0170933 A1 | | 11/2002 | Martin | |
| 2003/0221978 A1 | * | 12/2003 | Redzisz ................. | A45C 13/04 206/278 |
| 2011/0011906 A1 | | 1/2011 | Musgrave | |
| 2012/0305550 A1 | * | 12/2012 | Nickley ................... | B25H 3/00 220/9.2 |

* cited by examiner

*Primary Examiner* — Rafael A Ortiz
(74) *Attorney, Agent, or Firm* — John Rizvi; John Rizvi, P.A.—The Patent Professor®

(57) ABSTRACT

A tool bag carrying assembly comprising a supporting clip for clamping a tool bag to a mounting structure. The clip includes a first frame and a second frame that are pivotably connected to one another, such as by a friction hinge. The first frame can include a pair of sloped arms and a support bar. A rotatable cylinder can slide over the support bar and rotate freely about a transverse axis over the support bar, so as to reduce friction between tool bag and clip. The sloped arms can form an open segment that enables ingress and egress of the tool bag onto the rotatable cylinder. The second frame can include a pair of mount legs and a mount bar that slide into the mounting structure as the first frame presses against the mounting structure from an opposing side.

17 Claims, 10 Drawing Sheets

TOOL BAG CARRYING ASSEMBLY

FIELD OF THE INVENTION

The present invention relates generally to a tool bag carrying assembly, and more particularly, to a tool bag and supporting clip assembly that clamps to a structure (e.g., a user's clothes) through use of a clip for supporting a tool bag, and whereby the clip includes hinged first and second frames that are configured to carry the tool bag and clamp onto the structure in order to secure the tool bag to the structure.

BACKGROUND OF THE INVENTION

It is important in many jobs to have a tool bag or tool box within easy access. The tool bag is helpful for organizing, carrying, and protecting tools and instruments that are relevant to the job at hand. The tool bag can include mechanical tools, welding tools, medical instruments, utensils, and myriad other tools used in occupations that utilize a tool bag.

The use of the tool bag reduces the unfortunate bumbling that often occurs during a job, such as misplacing, dropping, or fumbling the tools while carrying out the job. In some instances, the user wears an apron or garment with extra-large pockets to hold the tools, keep them close at hand, and also to be able to move more freely. However, wearing an apron or extra-large pockets does not help the task of reaching for supplies while holding heavy objects or when constrained in a tight space. Also, the apron or large pockets can be difficult to don and remove after the job is finished.

Generally, a belt clip is worn by a user to securely fasten the tool bag to a belt, pocket, or other mounting structure on or near the user. In this manner, the user can store the tools in a convenient location to allow the user to use both hands for a task, or to rapidly switch to another tool. In another example, a user working with a ladder and carrying a tool bag attached to their belt or pocket does not have to interrupt work in order to climb down the ladder to replace or retrieve a tool. However, attaching the tool bag to the belt or pocket does not always form a secure connection. It would thus be beneficial to have a tool bag attachment that creates a secure clamp to the body of the user, while also allowing for easy access to the tools contained in the tool bag.

Accordingly, there is an established need for a tool bag attachment solution that is capable of solving at least one of the aforementioned problems, such as safely and conveniently securing a tool bag to a user.

SUMMARY OF THE INVENTION

The present invention is directed to a tool bag carrying assembly that clamps to a user, or mounting structure, while supporting a tool bag with a supporting clip. The clip comprises a first frame and a second frame that hingedly articulate to clamp onto a mounting structure. The supporting clip is easy to use and provides a safe and effective clamping of a tool bag onto a user or other mounting structure. The supporting clip is also durable and can be manufactured at reasonable cost as it does not necessarily require springs, bearings, or other mechanical components to clamp onto the mounting structure. The hinge can be a friction hinge configured to create multiple clamping points or angles that enhance the clamping effect.

In a first implementation of the invention, a tool bag carrying assembly for attaching a tool bag to a structure comprises a clip having a first frame and a second frame. The first frame is configured to carry a tool bag. The second frame is pivotably connected to the first frame. The tool bag carrying assembly is configured to pivotably adopt a clamping position in which the first and second frames are pivoted towards one another and configured to sandwich a structure therebetween, with the second frame arranged on one side of the structure and the first frame and tool bag arranged on an opposite, second side of the structure.

In a second aspect, the assembly can further include a tool bag configured to be carried by the first frame.

In another aspect, the tool bag can be non-removably carried by the first frame.

In another aspect, the assembly can further include at least one tool carried by bag.

In another aspect, the first frame can include an open segment configured to allow the insertion therethough of a loop for the hanging of said loop from the first frame. The loop can be comprised, for instance and without limitation, in a tool bag, key holder, etc.

In another aspect, the tool bag can be removably carried by the first frame, and can be removable from and fittable onto the first frame through the open segment.

In another aspect, the clip may also include a fastener operable to selectively open or close the open segment.

In another aspect, the fastener can be a threaded fastener.

In another aspect, the first frame may include a ring.

In another aspect, the first frame can include a rotatable cylinder configured for the supporting thereon of a loop comprised in a tool bag.

In another aspect, the first frame can include a pair of sloped arms and a support bar defining a triangular shape.

In another aspect, at least one of the sloped arms can include an open segment.

In another aspect, the ring can be disposed at an apex of the sloped arms.

In another aspect, the ring can be disposed within an interior space of the triangular shape.

In another aspect, the rotatable cylinder can be rotatably carried by the support bar.

In another aspect, the second frame can include a mount bar and a pair of mount legs forming a U-shaped arrangement.

In another aspect, the first and second frames may be pivotably connected to one another by a friction hinge such that the first and second frames are selectively adjustable to various rotational positions relative to one another and retained in said various rotational positions by friction within the friction hinge.

In another aspect, in the clamping position, the second frame can extend below the first frame.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a tool bag carrying assembly comprising a clip that clamps to a user, or mounting structure, while safely and conveniently supporting a tool bag.

Figure 3:
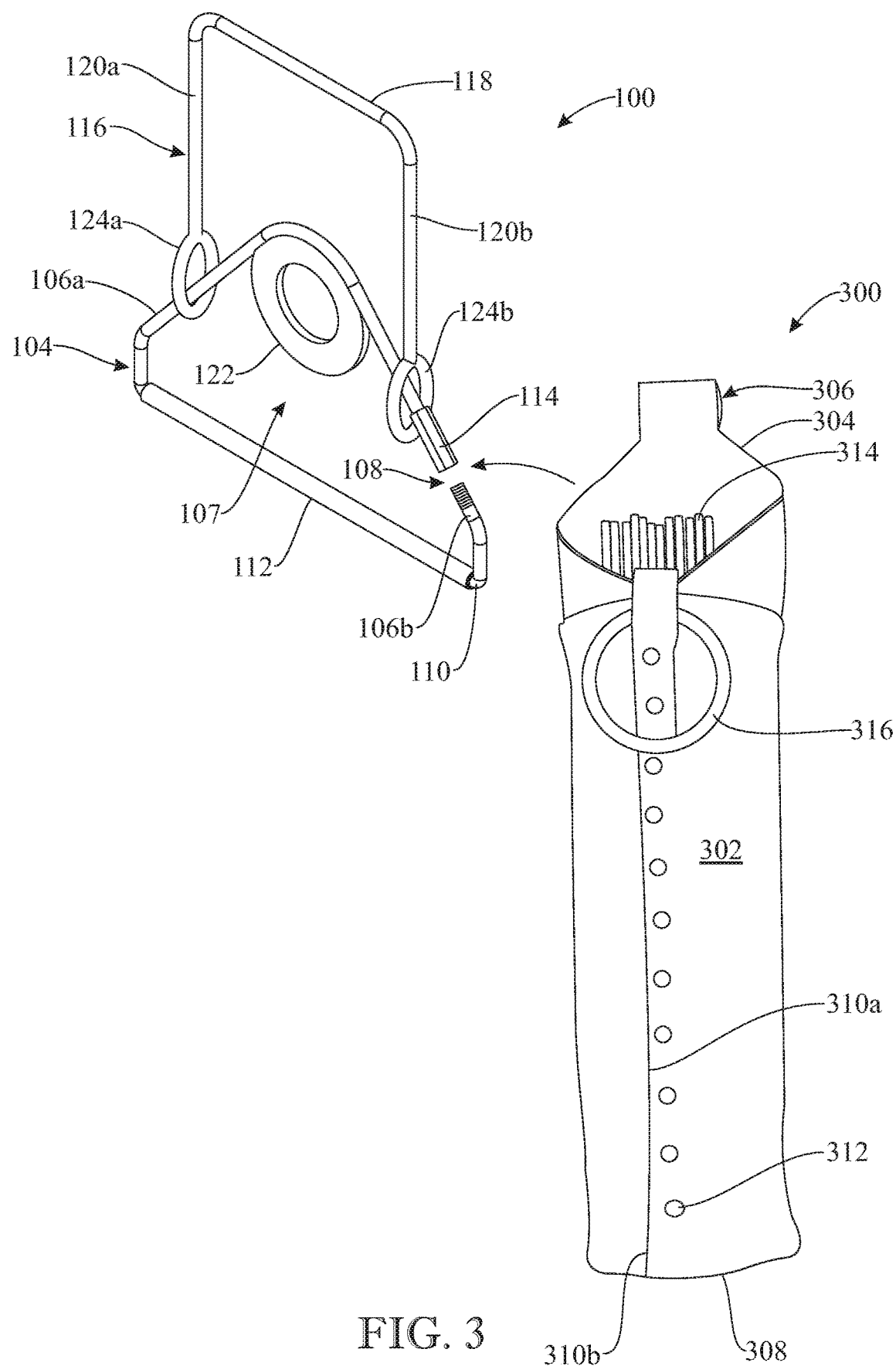
FIG. 3 presents a tool bag being hooked into the clip of the assembly shown in FIG. 1.

Referring initially to FIG. 3, a tool bag carrying assembly 100 is illustrated in accordance with an exemplary embodiment of the present invention. The tool bag carrying assembly 100, hereafter referred to as assembly 100, comprises a supporting clip 102 and a tool bag 300 carried by the supporting clip 102. The supporting clip 102 is configured to easily clamp to a mounting structure 700 (FIG. 7) or a mounting structure 900 (FIG. 9), while supporting the tool bag 300 through use of a friction hinge 124 that requires minimal mechanical components. The supporting clip 102 further comprises a support bar 110 on which a rotatable cylinder 112 is rotatably mounted. The rotatable cylinder 112 is configured to carry the tool bag 300 while eliminating a substantial amount of the friction against the tool bag 300. In addition to supporting the tool bag 300, the supporting clip 102 provides an ornamental appearance to the assembly 100.

As mentioned heretofore, the supporting clip 102 is configured to clamp on and off the mounting structure 700, 900, while carrying the tool bag 300 that in turn contains at least one tool. In some embodiments, the mounting structure 700, 900 may include, without limitation, a front pocket, a belt, a belt loop, a belt line, a pipe having a diameter between ⅛" and ⅕", a nail, and a wall. Thus, by means of the supporting clip 102, the tool bag 300 can be mounted proximally to the user for a wide variety of tasks or job types. For example, the user can rapidly and conveniently access a tool from the tool bag 300 when time is limited and proximal accessibility is required, or in tight spaces.

Figure 1:
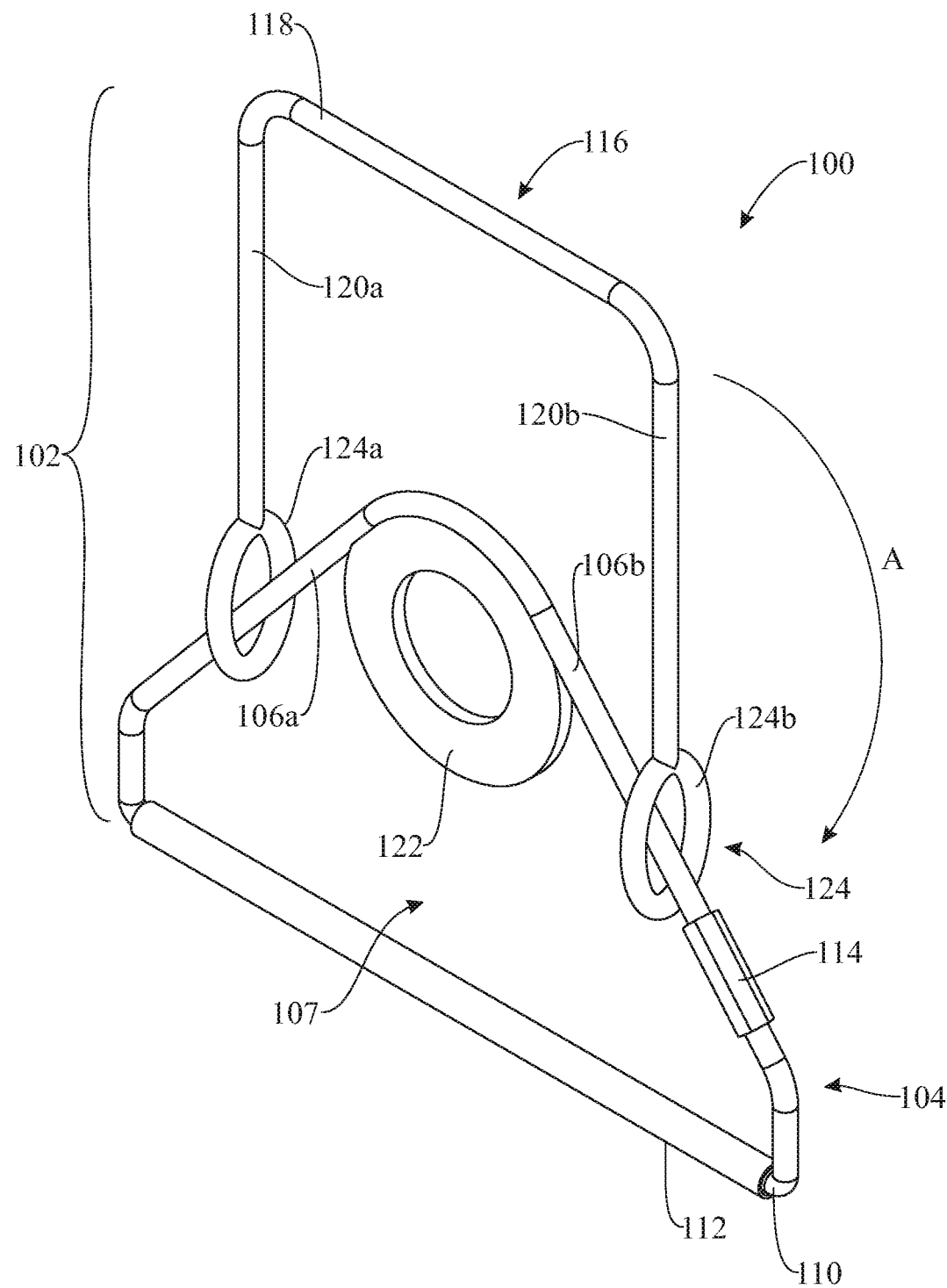
FIG. 1 presents an isometric view of an exemplary tool bag carrying assembly in accordance with the invention, showing a clip having a friction hinge, and a threaded fastener configured to open and close the open segment of a clip for insertion of a tool bag.
Figure 2:
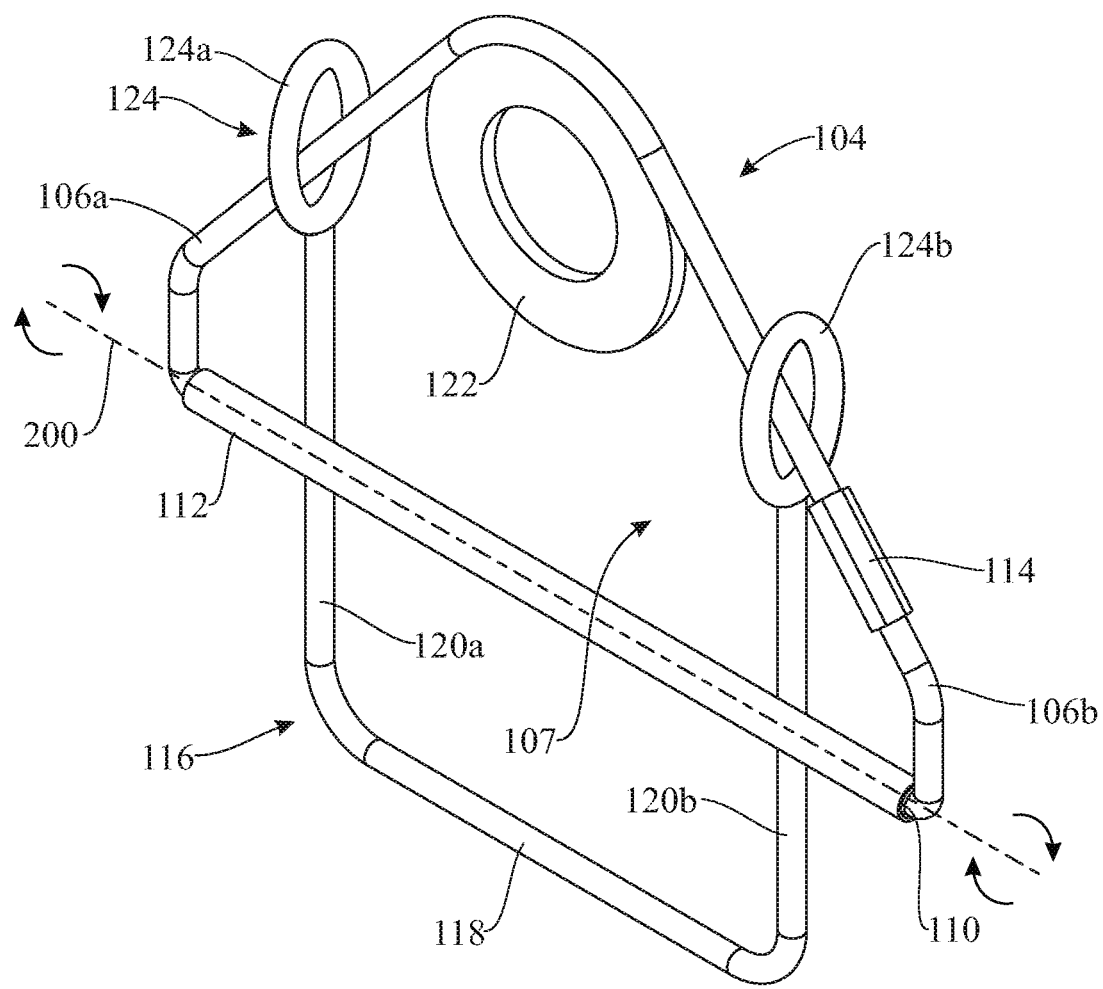
FIG. 2 presents an isometric view of the assembly shown in FIG. 1, showing the rotatable cylinder rolling about a transverse axis.

As shown in FIGS. 1 and 2, the supporting clip 102 comprises a first frame 104 and a second frame 116 that are pivotably attached to one another and hingedly articulate to and from each other depending on whether a clamping or unclamping function is needed. The illustration of FIG. 1 shows the assembly 100 in an extended position, in which the first frame 104 is pivoted away from the second frame 116 and are generally coplanar. Furthermore, FIG. 1 shows arrow A indicating how the second frame 116 can pivotally articulate towards the first frame 104 to clamp against a mounting structure 700, 900. In turn, FIG. 2 shows the assembly 100 in a folded or clamping position in which the first frame 104 has been pivoted towards the second frame 116.

With continued reference to FIG. 1, in some embodiments, the first frame 104 comprises a pair of sloped arms 106a, 106b and a support bar 110 that join together at their ends to define a generally triangular shape having an inside or internal space 107. The support bar 110 can be oriented horizontally when the supporting clip 102 is clamped to the mounting structure 700, 900. In one non-limiting embodiment, the first frame 104 further comprises a ring 122 disposed at the apex of the triangular shape, where the sloped arms 106a, 106b meet. The ring 122 may be used to hook onto the mounting structure 700, 900, in some applications, and to enhance the ornamental appeal of the assembly 100. In some embodiments, the ring 122 can be located on the inside or interior space 107 of the triangular shape, as shown, to minimize or prevent interference of the ring 122 in the pivoting of the second frame 116 relative to the first frame 104.

The illustration of FIG. 3 shows the assembly 100, illustrating that one or both of the sloped arms 106a and 106b of the first frame 104 can include at least one open segment 108; for instance, in the present embodiment, a single open segment 108 is formed in sloped arm 106b. The open segment or segments 108 enable a tool belt to ingress and egress into the interior space 107 of the triangular-shaped first frame 104 and to be fit onto or removed from the rotatable cylinder 112 about the support bar 110 of the first frame 104. As further shown in FIG. 3, the tool bag 300 is operable both attached to the supporting clip 102, or as a separate component hanging from its own bag ring 316, as described below.

In some embodiments, the one or more open segments 108 may be integrally formed out of the sloped arm 106*a* and/or the sloped arm 106*b*, and may be selectively opened or closed. For example, as shown in FIGS. 1-3, a threaded fastener 114 can be operational with the sloped arm 106*b* in order to selectively open or close the open segment 108 and regulate access into the first frame 104 for the tool bag 300, as illustrated in FIG. 3. The threaded fastener 114 is rotationally advanced between the termini of the open segment 108. In one non-limiting embodiment, the threaded fastener 114 comprises an elongated threaded nut. Though in alternative embodiments, different type of fasteners, such as spring-loaded gates, may be used.

Figure 4:
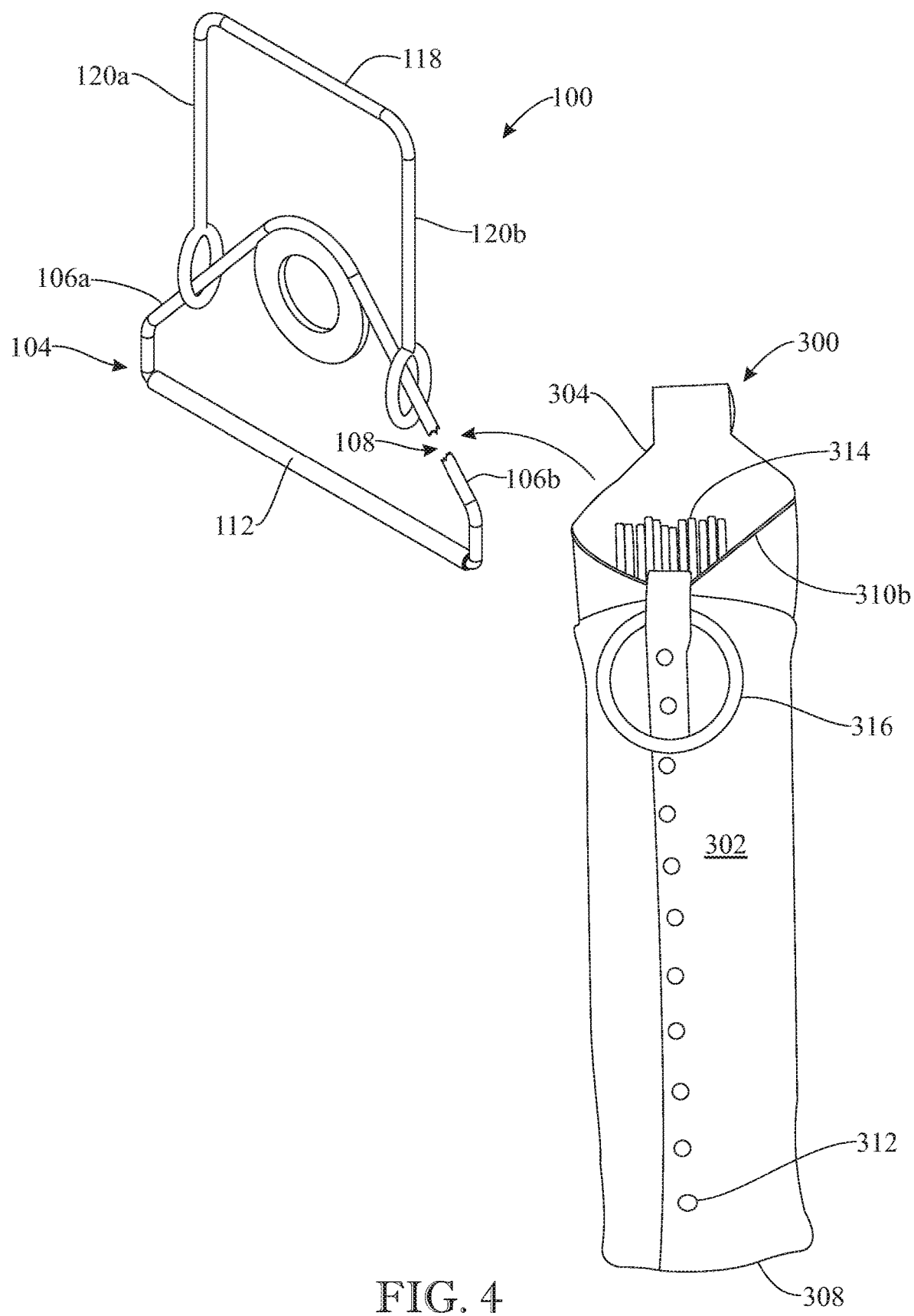
FIG. 4 presents an isometric view of the assembly shown in FIG. 1, in which the side segment in the first frame is initially separated or broken and the tool bag inserted onto the open segment.

In alternative embodiments, as shown for instance in FIG. 4, the open segment or segments 108 may be formed by cutting a section of the sloped arm 106*a* and/or the sloped arm 106*b*. Alternatively or additionally, the open segment 108 can be formed as a permanent opening in the first or second sloped arms 106*a* and 106*b*, wherein the permanent opening cannot be closed.

Figure 5:
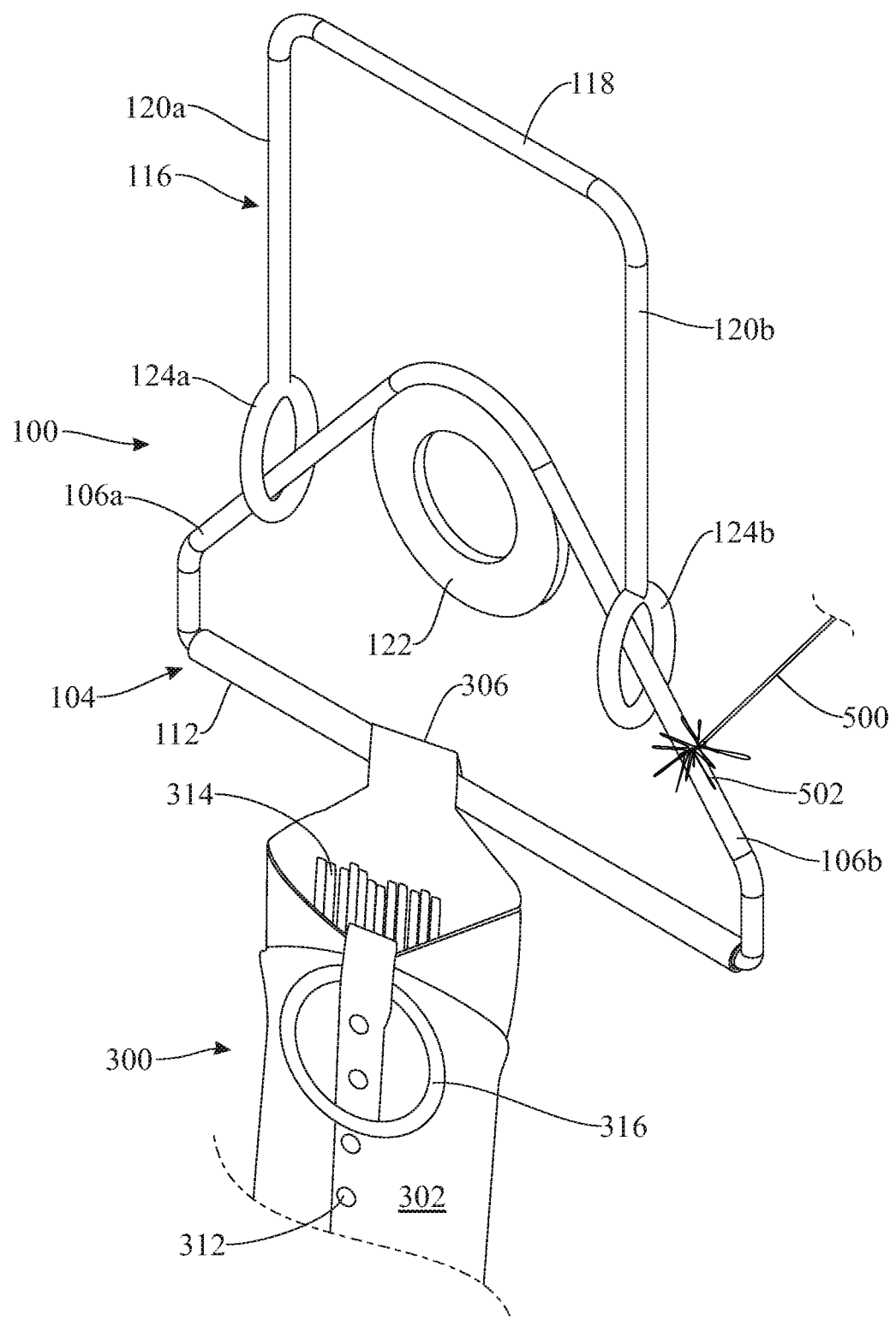
FIG. 5 presents an isometric view of the assembly shown in FIG. 1, showing a further step in which the open segment is welded to close the side segment and retain the tool bag in place.
Figure 6:
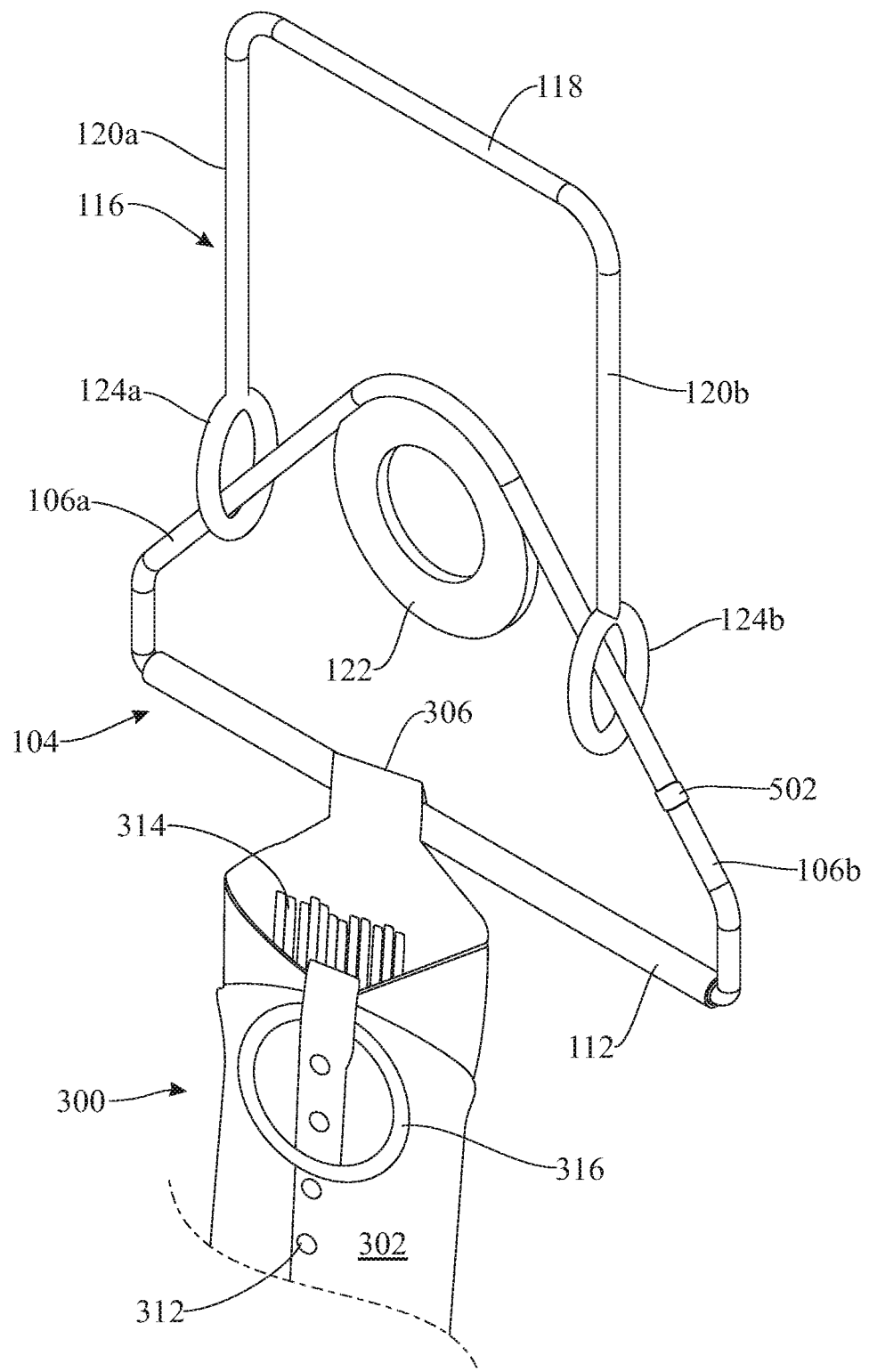
FIG. 6 presents an isometric view of the assembly shown in FIG. 1, showing the welded side segment.

In other embodiments, the open segment may be formed only initially, in order to allow initial coupling of the tool bag 300 onto the first frame 104, after which the open segment can be closed and the tool bag 300 can be permanently attached to the first frame 104. For example, as shown in FIGS. 5 and 6, the open segment 108 may be closed by a weld 500 through a welding process. In this arrangement, a section of metal 502 can join or close the open segment 108 in the first frame 104 by applying high temperatures therebetween. Unlike the threaded fastener 114 or other openable and closeable fastener, the weld 500 creates a permanent junction between clip 102 and tool bag 300.

Referring back to FIG. 2, the rotatable cylinder 112 coaxially encapsulates the support bar 110. In some embodiments, the rotatable cylinder 112 has a length that is generally equivalent to the length of the support bar 110, allowing the rotational cylinder 112 to substantially encapsulate the support bar 110. The rotatable cylinder 112 is also configured to rotate freely about a transverse axis 200. The rotatable cylinder 112 supports the tool bag 300 about the support bar 110, allowing the tool bag 300 to freely pivot about the support bar 110. This allows the rotatable cylinder 112 to rotate while still supporting a load, such as the tool bag 300. This free rotational arrangement can work to reduce or prevent frictional wear between the tool bag 300 and the supporting clip 102. Further, the triangular shape of the first frame 104 and the free-rolling configuration of the rotatable cylinder 112 on the support bar 110 create a unique, ornamental appearance for the assembly 100.

The second frame 116 forms the complimentary part of the supporting clip 102 that works in conjunction with the first frame 104 to clamp onto the mounting structure 700. When the supporting clip 102 is in the clamping position (FIG. 2), the second frame 116 is disposed adjacent to the first frame 104 such that the mounting structure 700 can be sandwiched by and between the second frame 116 and the first frame 104. For instance, the second frame 116 can be arranged rearward of the mounting structure 700 and the first frame 104 can be arranged frontward of or outwardly disposed from the mounting structure 700.

As further shown in FIG. 2, the second frame 116 can include a mount bar 118 and a pair of mount legs 120*a*, 120*b* that join at their ends to form a generally U-shaped body or U-shape. The mount legs 120*a*, 120*b* of the second frame 116 can be oriented perpendicularly to the mount bar 118. Alternatively or additionally, the mount legs 120*a*, 120*b* can be oriented perpendicularly to the rotatable cylinder 112. Alternatively or additionally, the rotatable cylinder 112 can be parallel to the mount bar 118.

Figure 9:
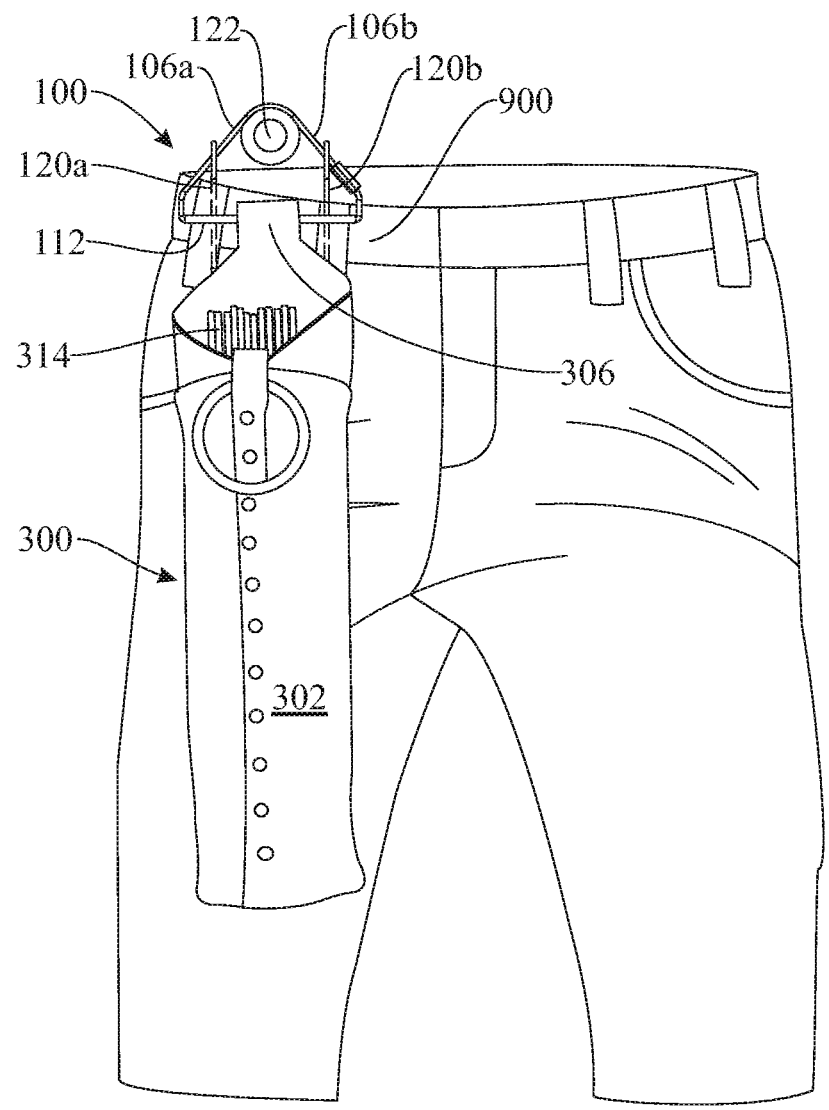
FIG. 9 presents the assembly shown in FIG. 1 clipped to a belt.
Figure 10:
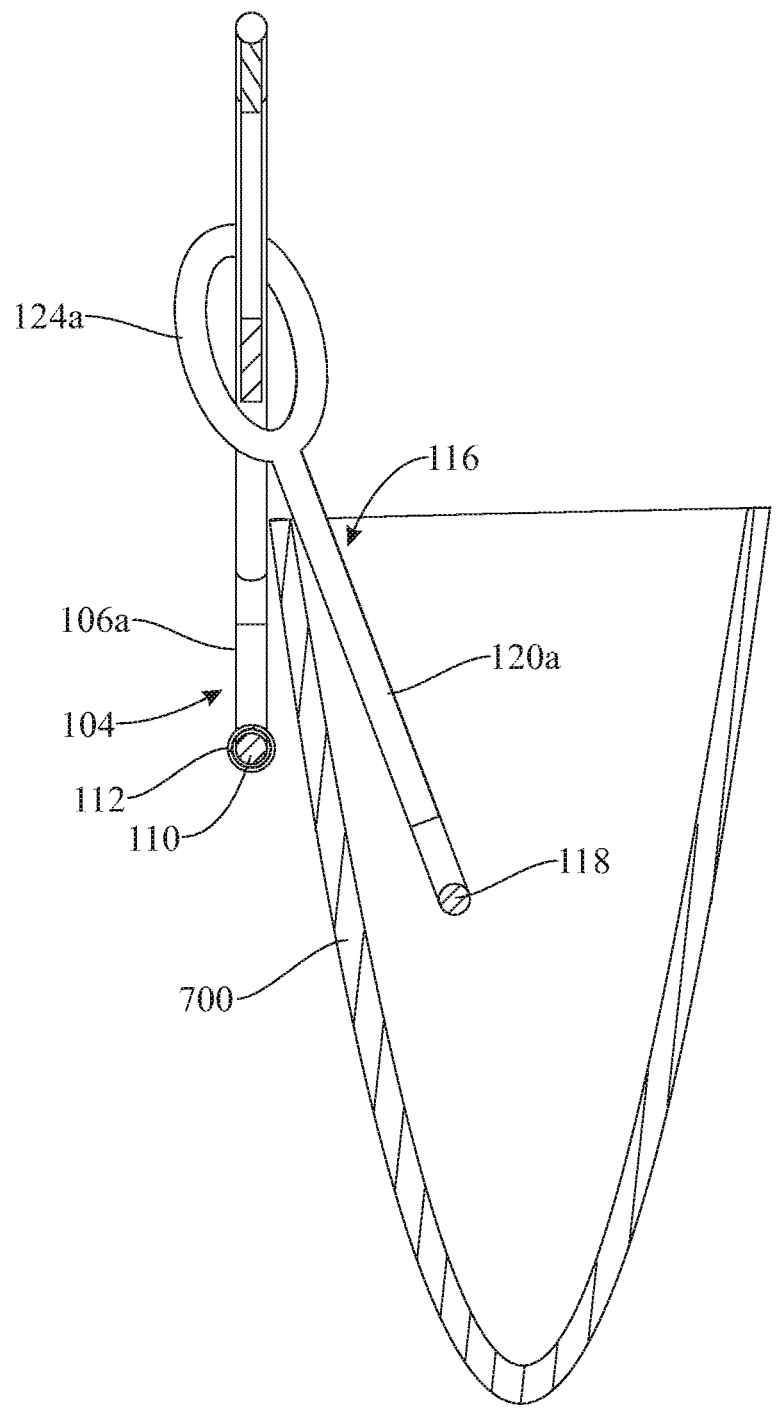
FIG. 10 presents a cross-sectional side elevation view of the assembly shown in FIG. 1 clipped onto a pocket as shown in FIG. 8.

In operation, as shown in FIGS. 9 and 10, the first and second frames 104, 116 are folded into the clamping position and are hung onto the mounting structure 700, pressing inwardly against the mounting structure 700 to clamp the assembly 100 to the mounting structure 700. In other applications of the invention, however, the mount bar 118 of the second frame 116 can hang directly from the mounting structure 700.

To enhance this clamping articulation between the frames 104, 116, the assembly 100 can utilize a friction hinge 124, which can be formed for instance by respective loops 124*a*, 124*b* terminating the mount legs 120*a*, 120*b* of the second frame 116 and pivotably coupled to the sloped arms 106*a*, 106*b* of the first frame 104. In other words, the friction hinge 124 of the present embodiment pivotally joins the sloped arms 106*a*, 106*b* of the first frame 104 with the mount legs 120*a*, 120*b* of the second frame 116. In some embodiments, the friction hinge 124 can creates multiple clamping points or angles as the second frame 116 pivots about the first frame 104 and is frictionally set to different angles relative to the first frame 104. This may provide controlled and adjustable clamping to the user or mounting structure. The friction hinge 124 can also provide resistance to unclamping of the clip 102, i.e. to switching the clip 102 away from the clamping position of FIG. 2 towards the extended position of FIG. 1, thus creating a stronger clamping force by the supporting clip 102 on the mounting structure 700, 900. Further, the friction hinge 124 is advantageous in that does not utilize springs, bearings, or other mechanical components in order to maintain the clip 102 clamped onto the mounting structure 700, 900.

Figure 7:
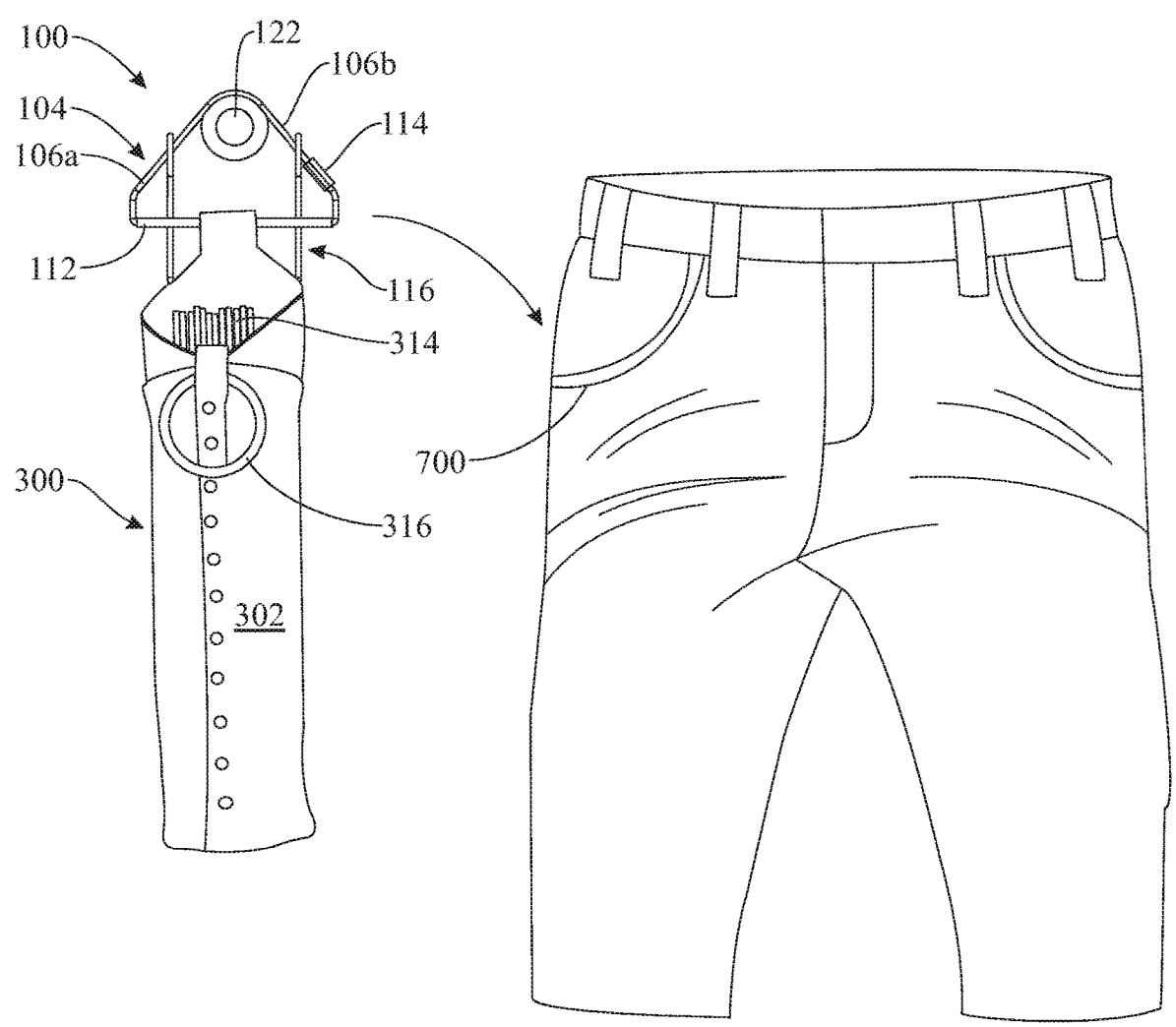
FIG. 7 presents the assembly shown in FIG. 1 being clipped onto a front pocket.
Figure 8:
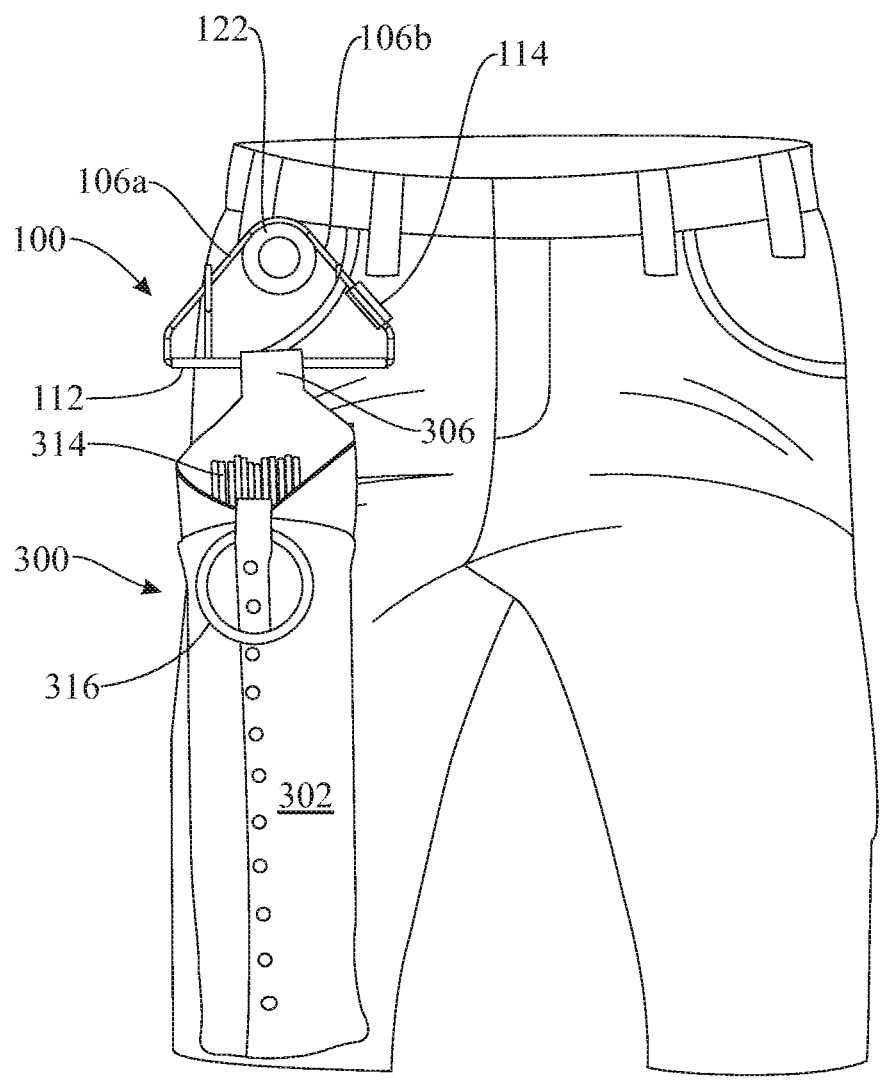
FIG. 8 presents the assembly shown in FIG. 1 clipped to the front pocket.

For example, FIGS. 7 and 10 present the first embodiment of the assembly 100 being clamped onto a mounting structure 700 provided by a front pocket of a pair of trousers. As illustrated, the tool bag 300 can be first attached to the supporting clip 102, either permanently or non-permanently as described heretofore. Next, the supporting clip 102 can align with the front pocket and clamp onto the front pocket, by inserting the downward-folded second frame 116 into the pocket, with the first frame 104 folding over the front surface of the pocket and the first frame 104 and hanging tool bag 300 remaining outside the pocket. The frames 104, 116 are then pivotally brought together against the front pocket, thereby creating a clamping configuration in which the clip 102 is clamped to the pocket. Unclamping of the clip 102 can be prevented by a relatively tight fitting of the second frame 116 inside the pocket. In some embodiments, the friction hinge 124 can help further prevent the frames 104, 116 from freely separating, and thereby disengaging the clamping function. In some embodiments, the multiple angular positions of the friction hinge 124 can further work to securely retain the supporting clip 102 to the front pocket. While clamped in to the front pocket, the tool bag 300 is easily accessible at the hip-level of the user. For example, the user can reach down and easily grab the tool in the tool bag 300.

Similarly, the illustration of FIG. 9 presents the assembly 100 clamped to a mounting structure 900 provided by a belt, slightly above the front pocket, such the mount legs 120*a*, 120*b* and mount bar 118 of the second frame 116 extend into the pants. The final clamped relationship between the supporting clip 102 and the belt would be similar to the configuration described with reference to FIG. 10.

With continued reference to FIG. 10, which illustrates a close up view of the second frame 116 extended into the front pocket or mounting structure 700, and the first frame 104 folded over the outer surface of the front pocket, it is significant to note that the length of the second frame 116 allows for deep penetration into the front pocket, belt, or other mounting structure. For this purpose, in some embodiments, as best shown in FIGS. 2 and 10, the second frame 116 can extend below the first frame 104 when the clip 102 is in the clamping position. For instance, in the present embodiment, the mount legs 120*a*, 120*b* and mount bar 118 of the second frame 116 extend below the rotatable cylinder 112 of the first frame 104 when the clip 102 is in the clamping position.

In one embodiment shown in FIGS. 3-5, the threaded fastener 114, or a weld, closes the open segment 108 to secure the tool bag 300 within the perimeter of the first frame 104. Once clamped to the mounting structure 700, 900, the tool bag 300 can be easily accessed. It is significant to note that in some embodiments, the tool bag 300 is not included with the assembly 100, and the supporting clip 102 can be operable with any type of tool or instrument container known in the art. In other embodiments, the assembly 100 comes with a tool bag 300 for containing at least one tool 314. The tool bag 300 can be removably or non-removably attached to the supporting clip 102, as described above. When attached to the supporting clip 102 in this manner, the tool bag 300 is effective for holding the tool 314, keeping the tool close at hand, and allowing the user to move more freely while working.

In some embodiments, the tool bag 300 may be defined by a top edge 304 that forms a loop 306 for attachment to the supporting clip 102, a bottom edge 308, and a pair of opposing lateral edges 310*a*, 310*b*. The top edge 304 of the panel 302 is oriented above the bottom edge 308 when the supporting clip 102 attaches to the mounting structure 700, 900. In this manner, gravity allows the tool bag 300 to hang freely off the rotatable cylinder 112. The lateral edges 310*a*, 310*b* of the panel 302 can comprise at least one bag fastener 312 for fastening the lateral edges 310*a*, 310*b* around the tool 314. The bag fastener 312 may include, without limitation, a snap button, a magnet, a zipper, and a hook and loop fastener. The tool bag 300 may also include a bag ring 316 attached to one of the lateral edges 310*b*, such as to hang the tool bag 300 directly onto the mounting structure 700, 900.

The panel 302 folds over and encapsulates at least one tool 314, such as a welding tool, mechanical tool, eating utensil, medical instrument, or writing instrument. The loop 306 at the top edge 304 of the panel 302 passes through the open segment 108 in the sloped arms 106*a*, 106*b*, serving as a supportive member to carry the weight of the tool bag 300 and the tool 314 contained therein.

The assembly 100 can be made of metal, plastic, or combinations thereof, for instance and without limitation. For example, the assembly 100 can be molded from aluminum, aluminum, steel, metal alloys, ABS resins, acetyl resins, nylon resins, urethane resins, or high impact polystyrene resins.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A tool bag carrying assembly comprising:
   a tool bag;
   a clip comprising:
   a first frame configured to carry the tool bag, the first frame comprising a pair of sloped arms and a support bar defining a triangular shape;
   a second frame pivotably connected to the first frame; wherein
   the tool bag carrying assembly is configured to pivotably adopt a clamping position in which the first and second frames are pivoted towards one another and configured to sandwich a structure therebetween, with the second frame arranged on one side of the structure and the first frame and the tool bag arranged on an opposite, second side of the structure and further wherein the tool bag carrying assembly is configured to proximally mount to a user.

2. The assembly of claim 1, further comprising at least one tool carried by the tool bag.

3. The assembly of claim 1, wherein the first frame comprises an open segment configured to allow the insertion therethough of a loop for the hanging of said loop from the first frame.

4. The assembly of claim 3 wherein the tool bag is removable from and fittable onto the first frame through the open segment.

5. The assembly of claim 3, wherein the clip further comprises a fastener operable to selectively open or close the open segment.

6. The assembly of claim 5, wherein the fastener is a threaded fastener.

7. The assembly of claim 1, wherein the first frame comprises a ring.

8. The assembly of claim 1, wherein the first frame comprises a rotatable cylinder configured for the supporting thereon of a loop comprised in tool bag.

9. The assembly of claim 1, wherein at least one of the sloped arms comprises an open segment.

10. The assembly of claim 1, wherein the first frame comprises a ring disposed at an apex of the sloped arms.

11. The assembly of claim 10, wherein the ring is disposed within an interior space of the triangular shape.

12. The assembly of claim 1, wherein the first frame further comprises a rotatable cylinder rotatably carried by the support bar.

13. The assembly of claim 1, wherein the second frame comprises a mount bar and a pair of mount legs forming a U-shaped arrangement.

14. The assembly of claim 1, wherein the first and second frames are pivotably connected to one another by a friction hinge such that the first and second frames are selectively adjustable to various rotational positions relative to one another and retained in said various rotational positions by friction within the friction hinge.

15. The assembly of claim 1, wherein, in the clamping position, the second frame extends below the first frame.

16. A tool bag carrying assembly for attaching a tool bag to a structure, the assembly comprising:
   a tool bag;
   a clip comprising:
   a first frame configured to carry the tool bag, the first frame comprising a pair of sloped arms and a support bar defining a triangular shape, the first frame further comprising a rotatable cylinder rotatably carried by the support bar wherein the rotatable cylinder wherein the rotatable cylinder allows the tool bag to freely pivot about the support bar;

a second frame pivotably connected to the first frame; wherein the tool bag carrying assembly is configured to pivotably adopt a clamping position in which the first and second frames are pivoted towards one another and configured to sandwich a structure therebetween, with the second frame arranged on one side of the structure and the first frame and tool bag arranged on an opposite, second side of the structure and further wherein the tool bag carrying assembly is configured to proximally mount to a user.

17. A tool bag carrying assembly for attaching a tool bag to a structure, the assembly comprising:

a tool bag;

a clip comprising:

a first frame configured to carry the tool bag, the first frame comprising a pair of sloped arms and a support bar defining a triangular shape, the first frame further comprising a rotatable cylinder rotatably carried by the support bar wherein the rotatable cylinder wherein the rotatable cylinder allows the tool bag to freely pivot about the support bar;

a second frame pivotably connected to the sloped arms of the first frame; wherein the tool bag carrying assembly is configured to pivotably adopt a clamping position in which the first and second frames are pivoted towards one another and configured to sandwich a structure therebetween, with the second frame arranged on one side of the structure and the first frame and tool bag arranged on an opposite, second side of the structure and further wherein the tool bag carrying assembly is configured to proximally mount to a user.

* * * * *